United States Patent [19]

Ackeret

[11] Patent Number: 4,804,085
[45] Date of Patent: Feb. 14, 1989

[54] DEVICE FOR STORING FLAT RECORDING MEDIA

[75] Inventor: Peter Ackeret, Kusnacht, Switzerland

[73] Assignee: IDN Inventions and Development of Novelties AG, Chur, Switzerland

[21] Appl. No.: 92,434

[22] Filed: Sep. 3, 1987

Related U.S. Application Data

[63] Continuation of Ser. No. 852,458, Apr. 1, 1986, abandoned.

[51] Int. Cl.4 .................... B65D 85/57; B65D 85/672
[52] U.S. Cl. ................................. 206/309; 206/387; 312/15
[58] Field of Search .................. 206/309, 387, 444; 220/345–350; 312/10, 12, 319, 15

[56] References Cited

U.S. PATENT DOCUMENTS

| 3,899,229 | 8/1975 | Ackeret | 312/319 |
| 4,087,145 | 5/1978 | Weavers | 206/387 |
| 4,266,834 | 5/1981 | Ackeret | 206/387 |

FOREIGN PATENT DOCUMENTS

| 2542622 | 4/1976 | Fed. Rep. of Germany | 206/387 |
| 2513333 | 10/1976 | Fed. Rep. of Germany | 206/387 |
| 3216888 | 9/1983 | Fed. Rep. of Germany | 206/387 |
| 3301203 | 7/1984 | Fed. Rep. of Germany | 206/387 |
| 2099793 | 12/1982 | United Kingdom | 206/387 |

Primary Examiner—Jimmy G. Foster
Attorney, Agent, or Firm—Chilton, Alix & Van Kirk

[57] ABSTRACT

Device for storing flat recording media having a housing and a slider member that is guided in the housing along rails. The housing includes a wall component and a plate component that is inserted into the wall component, the plate component being provided with the slider member guide means and preferably being injection-moulded from a low-friction plastics.

32 Claims, 5 Drawing Sheets

DEVICE FOR STORING FLAT RECORDING MEDIA

CROSS-REFERENCE TO RELATED APPLICATION

This application is a continuation of application Ser. No. 852,458 filed Apr. 1, 1986, now abandoned.

The invention relates to a device for storing flat recording media, especially compact cassettes or compact discs.

One previously known device for storing flat recording media is described and shown in published German Patent Application DE-A No. 23 43 487. This known device has an outer housing and recording media transport members which are slidably received therein. In the known device, the housing on the one hand and the slider member on the other hand are each injection-molded from thermoplastic material. During the manufacture of the housing, release from the mold takes place in the direction in which the slider member later moves, and since such release is possible only if a so-called "taper" is taken into account when the mold is designed, the surfaces of the slider guide rails formed in the housing are not exactly parallel. As a result, the lateral support of the slider member in its ejected position is relatively loose. If such a device is used in a motor vehicle, this can result in troublesome rattling.

The problem underlying the invention is to design a device of the same type in such a manner that the above described disadvantage is overcome.

This problem is solved according to the invention by separately manufacturing a plate which includes the guide means for each slider or transport member and inserting such "plates" into the molded housing.

The housing is, accordingly, composed of a plurality of parts (at least two) which are each injection-molded separately. Such separately formed parts may be complimentary so that they can be released from their respective molds and, when joined together the accurate guidance of the slider member is ensured. This design also gives rise to further advantages: it is possible to select for the plate(s) a material different from that of the (remaining portion of the) housing, namely a material that, although expensive, has more favourable coefficients of friction with respect to the slider member material; this is justifiable if the size of the plate is selected to be small relative to the remaining portion of the housing. A further possible advantage lies in the fact that during subassemblies there are formed assemblies each consisting of a plate on the one hand and the slider member ejection spring arrangement and/or the slider member itself on the other hand, which are then inserted as complete units into the (remaining portion of the) housing. This is preferred especially when a plurality of such subassemblies is to be accommodated in a single housing.

Embodiments of the subject of the invention are described in detail below with reference to the accompanying drawings.

The embodiments of FIGS. 1–6 are devices for storing compact cassettes while the embodiment of FIGS. 7–10 is a container for "compact" discs, and the embodiment of FIG. 11 is again intended for compact cassettes.

Figure 1:
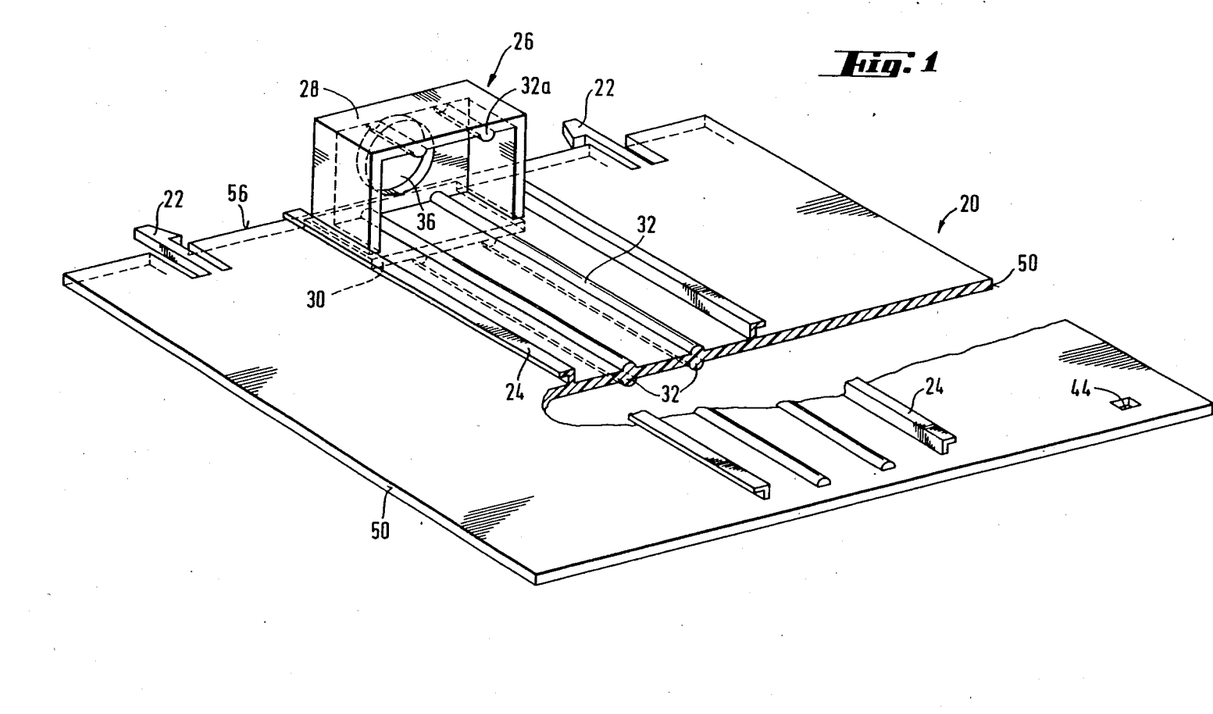
FIG. 1 shows a perspective view partly in section of a plate that can be inserted into the remaining portion of a housing in accordance with a first embodiment of the invention.
Figure 2:
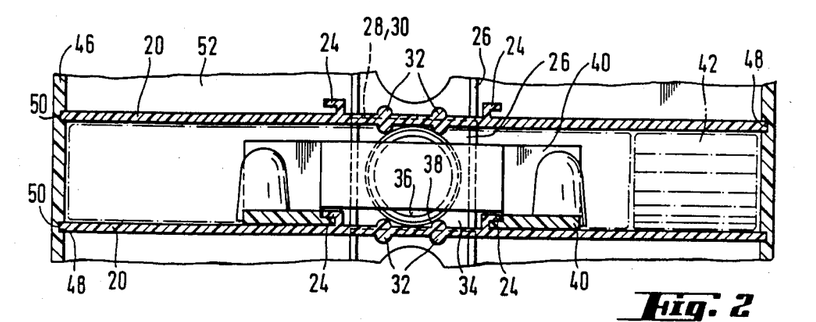
FIG. 2 shows a vertical section through a part of the finished assembled device in accordance with a first embodiment.
Figure 3:
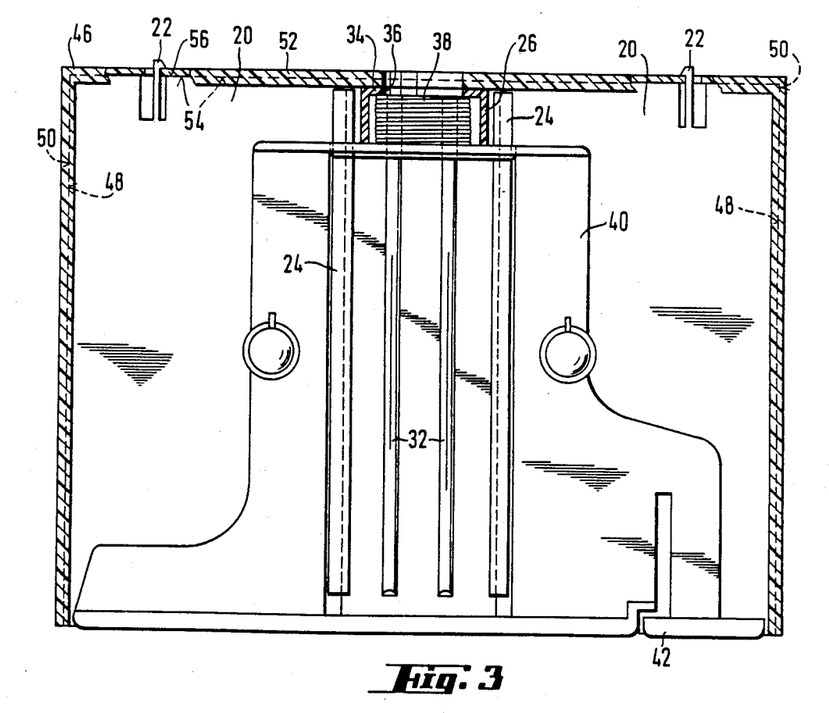
FIG. 3 shows a horizontal section through the finished assembled device the embodiment of FIGS. 1 and 2 seen from above.

The embodiment of FIGS. 1-3, while only partially shown, would in practice include several slider members accomodated in a common housing, a "plate" being inserted into the housing for each slider member.

FIG. 1 shows such a plate 20 with integrally-formed anchoring hooks 22, slider member guide rails 24 and, indicated generally at 26, a "spring box". A recess 30 is arranged on the underside of plate 20. from the box, and the depth of the depression corresponds to thickness of the top wall 28 of spring box 26. The profile of the plate 20 can be seen in the region shown broken away in the drawing; in addition to the rails 24, there are formed above and below the plate and integrally therewith ribs 32 which support a helical compression spring against bending outwardly i.e., against buckling. The lower ribs 32 extend only as far as the inner edge of the depression 30. The inside of the spring box 26 top wall 28 has corresponding ribs 32a. When several pre-assembled assemblies are inserted into a common housing, the ribs 32a form an extension of the lower ribs 32 on the plate arranged immediately above, and so on. For the lowermost plate in the housing, a space is provided in the housing for the lower ribs 32. For the uppermost plate in the housing, an auxiliary "plate" should be provided which is smooth on its upper surface and, on its underside, has lower ribs 32 and the depression 30. This auxiliary plate may be defined by the top wall of the housing.

The rear wall 34 of the spring box has an opening 36. For preliminary assembly, the plate 20 is placed by means of this hole onto the spike of an assembly aid, a helical spring 38 (FIG. 2) is threaded onto the spike, the spring then being supported inside against the rear wall 34 of the spring box around the opening 36. A slider member 40 is then pushed onto the guide rails in the direction towards the spring box, the spike thus being pushed out of the way. In the inner end position of the slider member, as shown in FIG. 3, the spring 38 is compressed in the spring box and the slider member is locked on the plate by means of a projection on a release button 42 engaging an opening 44 in the plate. The construction of the locking mechanism which includes release button 42 is not shown in detail for reasons of clarity; and reference made be had to the prior art mentioned above for further details thereof. The arrangement of the stops that limit the ejection path of the slider member may also be seen from the above-referenced published German application.

The subassembly that has been preassembled in the manner described above can be stored temporarily until it is to be installed in the remaining portions of the housing 46. These remaining portions of the housing have pairs of oppositely disposed lateral grooves 48 which receive the side edges 50 of the plate 20. Grooves 54 are also provided on the inner side of the rear wall 52 of the remaining portion of the housing, in which grooves the end edges 56 of the plates finally engage. At the same time, the anchoring hooks 22 on the plate pass through apertures provided in the rear wall 52 of the housing and engage behind the outer face of the rear wall. It should be noted that in FIG. 2 only one subassembly is shown in full. Only the plate of the adjacent above subassembly is shown, without the spring and the slider member.

In the embodiment according to FIGS. 1 to 3, the preassembled subassembly is deeper than the depth of the slider member by the combined length of the compressed spring 38 and the thickness of the rear wall of the spring box, and the same applies also, of course, to the remaining portion of the housing. If, in this connection, the spatial conditions are restricted, for example in the case of a device installed in recesses in a motor vehicle interior, the embodiment according to FIGS. 4 to 6 may be preferable.

In this embodiment each plate 100 has a recessed channel 102 which lies approximately in the plane of symmetry of the housing 104. As can be seen in FIG. 5, the channel is covered at the front by means of an upright bar 106 formed integrally with the plate 100; storage space corresponding to the height of this bar is therefore lost in comparison with the embodiment according to FIGS. 1 to 3. However, in compensation, almost the entire depth of the housing can be utilised for the slider member since a helical tension spring 108 may be employed as the ejection spring. This spring 108 is attached at its inner end in the housing to a peg 112 that projects downwards from the rear wall 110 of the slider member. The opposite end of spring 108 is attached to a peg 114 which projects upwardly from the base of the channel 102 behind the bar 106. On both sides of the spring, still inside the channel 102, stop pieces 116 extend forwards from the rear wall of the slider member and limit the outer end position of the slider member by running up against the bar 106. The housing 104 is otherwise analogous to that according to FIGS. 1 to 3 except that the anchoring hooks 118 on the plate 100 of the embodiment of FIGS. 4–6 engage openings in the side walls of the housing rather than openings in the housing rear wall. With regard to the locking arrangement, reference should be made to the comments made above in connection with the discussion of the embodiment of FIGS. 1 to 3.

The embodiment according to FIGS. 7 to 10 is intended for storing compact discs but, could be modified for compact cassettes if, for example, the cassettes were to be positioned on the slider member so as to be oriented not in the transverse direction (as in FIGS. 1 to 6) but in the longitudinal direction. In addition to the elements shown in the drawing, the device according to FIGS. 7 to 10 also includes holders, each arranged to support one compact disc, of which at least one is transported out of the housing by the slider member. The details of such a slider-holder arrangement do not form part of the present invention and it is sufficient to refer to the published European application EP-A No. 83 108 472.8 for such details.

The remaining portion of the housing 200 of the embodiment of FIGS. 7–10 has lateral grooves into which plate(s) 202 can be inserted by means of edges 204 thereof. When the plate is inserted, a hook 206, formed integrally with the inner end edge of the plate, is resiliently deflected as a result of striking the edge of a corresponding opening in the housing rear wall and then engages behind the rear wall 208 of the housing.

In its plane of symmetry, the plate 202 has a depression 210 which extends over the entire insertion depth of the plate. The side walls which define the depression 210 contain guide grooves 212. Grooves 212 are parallel to the lateral grooves in the housing. Guide grooves 212 receive angled guide ribs 214 which are provided on slider member(s) 216. Close to the forward end edge 218 of the plate 202 a stop block 220, for a stop lug 222 on the slider member and a post 224 about which a helical tension spring 226 wraps, project upwardly from the base of the depression 210. One end of the spring 226 is attached to a peg 228 which is provided on plate 202 at the side, next to the locking hook, in the depression 210, and the other end of the spring is fastened to a hook 230 which projects downwards into the depression 210 from the slider member 216 close to the rear end of the slider member. In order to reduce friction, a rotatably mounted roller or capstan 232, having a circumferential groove in which the spring 226 is guided, is mounted on the post 224.

Figure 4:
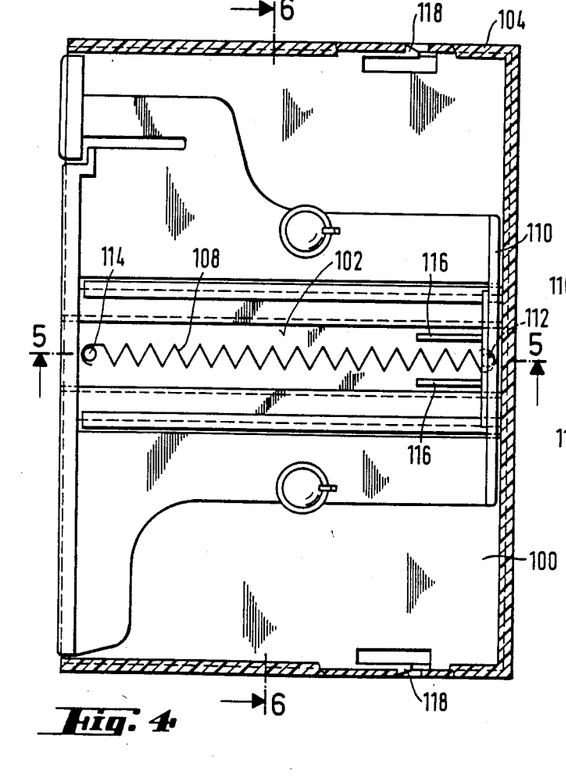
FIG. 4 shows, in a manner analogous to FIG. 3, a second embodiment.
Figure 5:
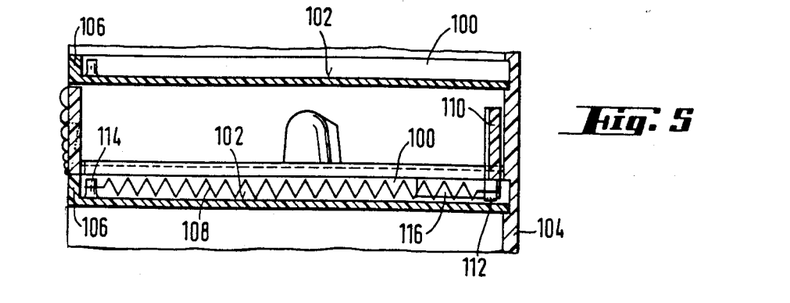
FIG. 5 shows a partial section along line 5—5 of FIG. 4.
Figure 6:
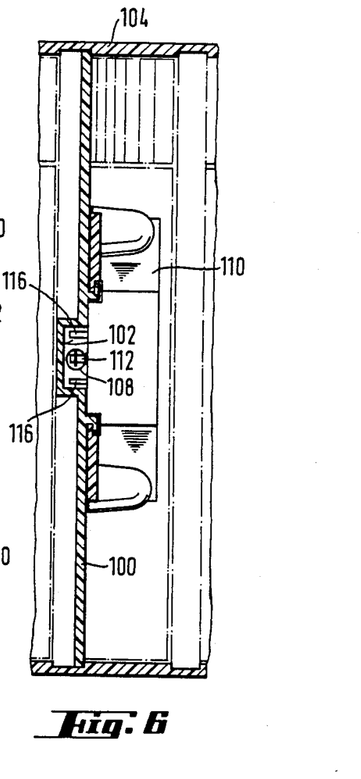
FIG. 6 shows a partial section along line 6—6 of FIG. 4, analogously to FIG. 2.
Figures 7, 8, 9, 10:
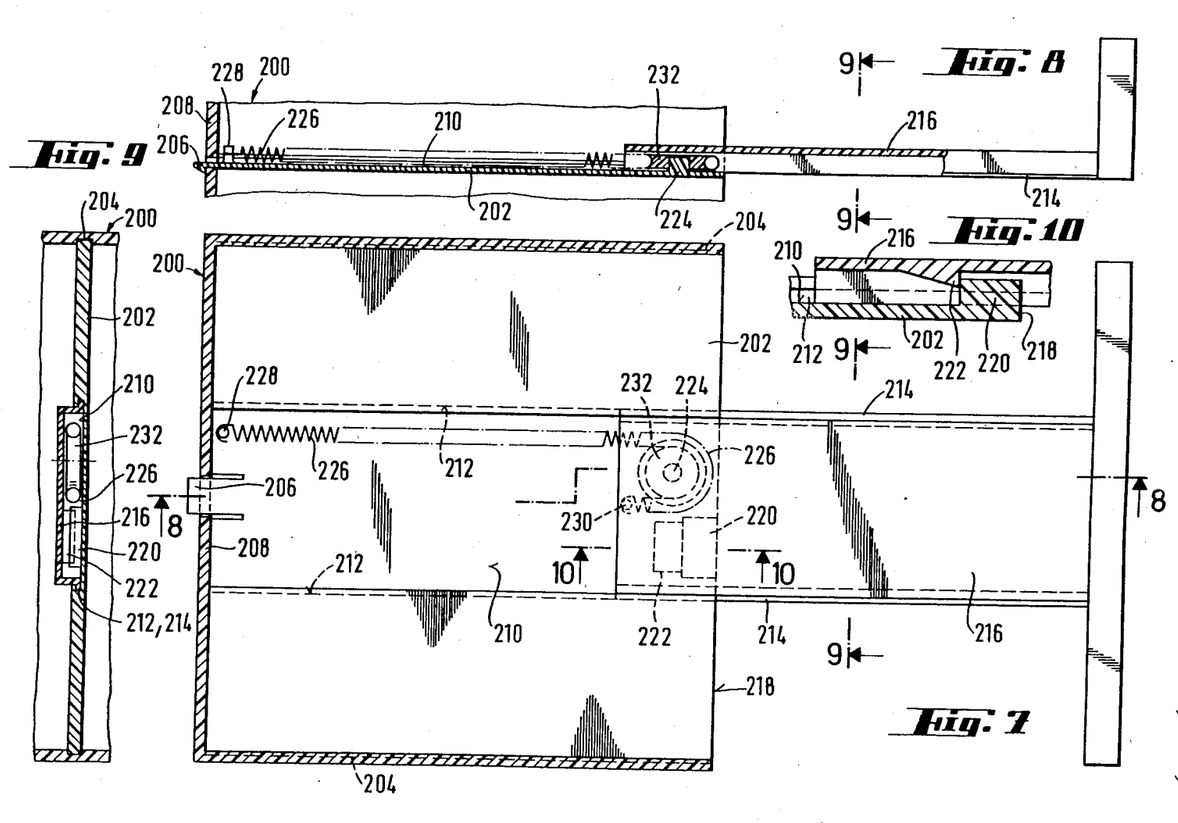
FIG. 7 shows a horizontal section, analogous to FIG. 3, through a third embodiment but the slider member is shown in the second position.
FIG. 8 shows a section along line 8—8 of FIG. 7.
FIG. 9 shows a section along line 9—9 of FIG. 8.
FIG. 10 shows a partial section along line 10—10 of FIG. 7.

While in the construction method according to FIGS. 4 to 6 automatic assembly is somewhat complicated because first the spring 108 has to be attached to the plate, then the slider member must be inserted and finally the other end of the spring can be attached to the slider member peg, to which access is then relatively poor, the arrangement of the spring in the embodiment of FIGS. 7–10 is more advantageous since the spring can be anchored to the pegs by both ends before the slider member is inserted into the guide grooves and the spring then winds around the roller 232 "automatically".

Figure 11:
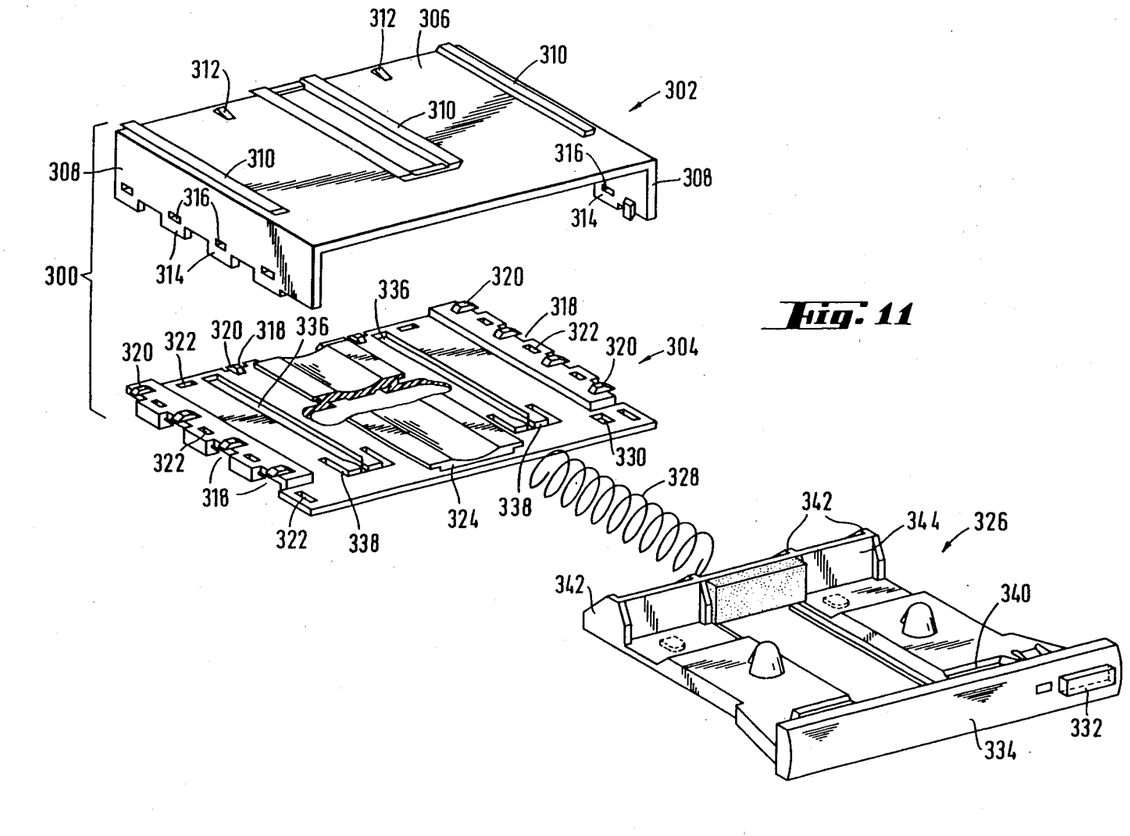
FIG. 11 shows a partial exploded view of a fourth embodiment.

The embodiment according to FIG. 11 is intended for compact cassettes. The housing 300 comprises a wall component 302 and a plate 304. The wall component 302 includes the top wall 306, side walls 308 and a rear wall (which cannot be seen in the drawing). On the top wall 306 there are provided stacking devices in the form of bars 310 and projections 312, onto which a second housing of similar construction can be fitted. The free edges of the side walls and also the rear wall have projections 314 each of which is provided with an opening 316.

On three sides of its circumference the plate 304 is constructed to be complementary to the mentioned projections and openings in such a manner that the projections 314 fit into cut-out portions 318, and lugs 320 on the plate can snap into the openings 316. The two parts 302, 304 can, accordingly, be snapped together but there are, of course, other possible methods of connection, for example ultrasonic welding. For better centering the plate 304 is also provided with depressions or openings 322 which receive corresponding complementary extension pieces of the side walls and the rear wall of the wall component 302.

It is also possible to see in FIG. 11 the guide rail 324, formed integrally with the plate 304, for a slider member 326, which rail is upwardly concave in the centre in order to support the helical compression spring 328 against bending outwards. On insertion, the slider member 326 is arrested by cooperation with a catch 330 in the plate, and this locking mechanism may be released by pressure on a release button 332 in the front wall 334 of the slider member. Extension pieces are formed integrally with the underside of the slider member base and these engage in slots 336 in the plate 304 to define the direction and limit of motion of the slider member relative to the housing. The end of each slot closest to the housing opening or front tapers inwardly. The region of the plate 304 at the front end of slots 336 is rendered flexible by means of providing cut-out portions 338. Accordingly when the slider member is ejected from the housing by the spring 328, the slider member extension pieces which are engaged in slots 336 will be caught gently as a result of the walls of the slots being deflected resiliently outwards. This gentle arresting of the slider member motion upon ejection is possible only if the plate is manufactured separately. On the slider member there is also a depression 340, which receives the portion of increased depth that is customary in compact cassettes, and also reinforcing ribs 342 for the rear wall 344 of the slider member, against which the spring 328 engages.

It will be understood that a portion of the side walls of the housing or the rear wall can also be formed integrally with the plate 304 instead of with the component 302, provided that the mold release requirements for ejection molding are still fulfilled.

I claim:

1. A device for storing flat recording media comprising:
   a housing having a top wall, side walls, a rear wall and an open front;
   at least one plate member disposed in said housing opposite said top wall, said plate member cooperating with said housing walls to define at least one compartment in said housing, said plate member including guide rails positioned in said compartment;
   a slider member in each said compartment, each said slider member having a bottom which defines a recording media support surface, said slider members cooperating with plate member guide rails whereby said slider members are moveable through said housing open front between an inserted portion where a recording media supported on said support surface is located in a said compartment and an ejected position in which recording media can easily be removed from the slider member;
   a spring in each said compartment for biasing the slider member in the compartment toward its ejected position, each said spring assuming an extended configuration when its associated slider member is in the inserted position, a tensioned, bias-producing portion of each said spring being positioned between a said slider bottom and a said plate member when in said extended configuration, said spring members pulling said slider members from the inserted toward the ejected position of the slider members; and
   manually releasable locking means for holding each slider member in its inserted position against the bias of an associated said spring.

2. A device as set forth in claims 1 wherein one end of said spring is fastened to said housing.

3. A device as set forth in claim 2 wherein said one spring end is fastened adjacent the open housing front through which said slider member moves.

4. A device as set forth in claims 3 wherein said one spring end is fastened to said plate member.

5. A device as set forth in claim 1 wherein each plate member is fixed to at least one of said housing walls by means of integral anchoring elements.

6. A device as set forth in claim 5 wherein said plate member and said housing walls are made of different plastic material.

7. A device as set forth in claim 1 wherein one end of each said spring is fastened to said slider member adjacent an inner end of said bottom.

8. A device as set forth in claim 1 wherein each said spring is positioned symmetrically with respect to said guide rails.

9. A device as set forth in claim 8 wherein each of said springs is a helical spring extending along a plane of symmetry between two parallel guide rails.

10. A device as set forth in claim 1 wherein each said slider member bottom has a central bottom member with said spring therebeneath.

11. A device as set forth in claim 1 wherein each said plate member carries a roller adjacent the open housing front through which said slider moves, and each said spring comprises a helical spring having a first end fastened at said housing adjacent the rear wall thereof, being laid about said roller and having its other end fastened at said slider member adjacent an inner end of said bottom.

12. A device as set forth in claim 1 wherein each said plate member has slots into which stop members of said slide member extend, and said slots having resilient stop ends.

13. A device as set forth in claim 1 wherein at least part of said locking means is provided on said plate member.

14. A device as set forth in claim 1 wherein said plate member defines a channel wherein said spring is located.

15. A device as set forth in claim 14 including a front end cover for said channel formed integrally with said plate member.

16. Apparatus for the storage of recording media comprising:
   housing means, said housing means having at least a top wall, said housing means also having oppositely disposed side walls and a rear wall, said housing means having a front which is disposed oppositely with respect to said rear wall, said walls and top in part defining an internal housing means volume which is accessible from the housing means front;
   at least a first plate member, said plate member being sized to be received in said housing means and to cooperate with walls thereof to partition said housing means volume to thereby define at least a first cavity said said housing means, said plate member having anchoring means integral therewith for engaging said housing means to lock said plate member in said housing means;
   a slider member disposed in said cavity;
   guide means for slidably guiding said slider member for movement relative to said housing means between an inserted position and an ejected position wherein the slider member in part extends outwardly from said housing means through said housing means front, said guide means being integral with said plate member;

stop means for defining the ejected slider member positions, a recording medium transported by said slider member being accessible from the exterior of said housing means when the slider member is in the ejected position;

manually releasable locking means for defining the inserted slider member positions; and spring means for biasing said slider member toward the ejected position thereof, said spring means each being coupled at a first end to a plate member and cooperating therewith to form a subassembly which is installed in said housing means, thereby being one such subassembly for each defined housing means cavity.

17. The apparatus of claim 16 wherein the second end of said spring means acts on said slider member and wherein said subassembly comprises said slider member supported on said plate member in cooperative relationship with the guide means which are integral with the said plate member.

18. The apparatus of claim 17 wherein said housing means and said plate member are molded from different material.

19. The apparatus of claim 17 wherein said locking means comprises:
a release button;
an aperture in the plate member; and
latch means carried by said slider member and resiliently biased toward engagement with said plate means aperture, said latch means being operable in response to movement of said button to disengage from the cooperating aperture.

20. Apparatus for the storage of recording media comprising:
housing means, said housing means having at least a top wall, said housing means also having oppositely disposed side walls and a rear wall, said housing means having a front which is disposed oppositely with respect to said rear wall, said walls and top in part defining an internal housing means volume which is accessible from the housing means front;
at least a first plate member, said plate member being sized to be received in said housing means and to cooperate with walls thereof to define at least a first cavity within said housing means, said plate member having anchoring means integral therewith for engaging said housing means to lock said plate member in said housing means;
a slider member disposed in said cavity, said slider member being mounted on said plate member and cooperating therewith to define a subassembly which is installed in said housing means;
guide means for slidably guiding said slider member for movement relative to said housing means between an inserted position and an ejected position wherein the slider member in part extends outwardly from said housing means through said housing means front, said guide means being integral with said plate member and forming part of said subassembly;
stop means for defining the ejected slider member position, a recording medium transported by said slider member being accessible from the exterior of said housing means when the slider member is in the ejected position;
manually releasable locking means for defining the inserted position of said slider member; and
spring means for biasing said slider member toward the ejected position thereof.

21. The apparatus of claim 20 wherein said housing means and said plate member are molded from different material.

22. The apparatus of claim 20 wherein said locking means comprises:
a release button;
an aperture in the plate member; and
latch means carried by said slider member and resiliently biased toward engagement with said plate means aperture, said latch means being operable in response to movement of said button to disengage from the aperture.

23. Apparatus for the storage of recording media comprising:
housing means, said housing means having at least a top wall, said housing means also having a pair of oppositely disposed side walls and a rear wall, said housing means having a front which is disposed oppositely with respect to said rear wall, said walls and top in part defining an internal housing means volume which is accessible from the housing means front;
at least a first plate member, said plate member being sized to be received in said housing means and to cooperate with walls therewith to partition said housing means volume to thereby define at least a first cavity within said housing means, said plate member having anchoring means integral therewith for engaging said housing means to lock said plate member in said housing means;
slider means disposed in said first cavity, said slider means having a bottom plate portion;
guide means for slidably guiding said slider means for movement relative to said housing means between an inserted position and an ejected position wherein the slider means in part extends outwardly from said housing means through said housing means front, said guide means being integral with said plate member;
stop means for defining the ejected position of said slider means, a recording medium transported by said slider means being accessible from the exterior of said housing means when the slider means is in the ejected position;
manually releasable locking means for defining the inserted position of said slider means; and
spring means for biasing said slider means toward the ejected position thereof, said spring means comprising a tension spring disposed between said plate member and the bottom plate of said slider means which cooperates therewith.

24. The apparatus of claim 23 wherein said plate member, cooperating slider means and a tension spring form a pre-assembled unit which may be installed in said housing means.

25. The apparatus of claim 23 wherein said plate member and cooperating slider means have front and rear ends, and wherein said plate member is provided with a channel extending in the direction of slider means movement, said tension spring extending along said channel and being connected at a first end thereof to the slider means adjacent the rear end thereof, the second end of said tension spring being attached to the plate member at a point thereon adjacent the front end thereof, said spring second end attachment point on said plate member being positioned in the direction of slider means travel in front of said slider means stop means, said stop means being integral with said plate member.

26. The apparatus of claim 25 wherein said plate member, slider means and a tension spring form a subassembly unit which may be installed as a unit in said housing means cavity.

27. The apparatus of claim 23 wherein each of said plate member and cooperating slider means have front and rear ends and wherein said slider means is provided with a channel extending in the direction of movement of the slider means, said tension spring being positioned in said channel with a first end thereof coupled to the slider means adjacent the rear end thereof, the plate member being provided with a capstan positioned adjacent the front end thereof, said tension spring passing around said capstan and being connected to said plate member at an attachment point thereon located toward the rear end of said plate member relative to said capstan.

28. The apparatus of claim 27 wherein said plate member, slider means and a tension spring form a subassembly unit which may be installed in a said housing means cavity as a unit.

29. The apparatus of claim 28 wherein said housing means and said plate member are molded from different material.

30. The apparatus of claim 28 wherein said locking means comprises:
a release button;
an aperture in the plate member; and
latch means carried by said slider member and resiliently biased toward engagement with said plate means aperture, said latch means being operable in response to movement of said button to disengage from the aperture.

31. The apparatus of claim 23 wherein said housing means and said plate member are molded from different material.

32. The apparatus of claim 23 wherein said locking means comprises:
a release button;
an aperture in the plate member; and
latch means carried by said slider member and resiliently biased toward engagement with said plate means aperture, said latch means being operable in response to movement of said button to disengage from the aperture.

* * * * *